(12) United States Patent
Kurakami (10) Patent No.: US 11,943,250 B2
(45) Date of Patent: Mar. 26, 2024

(54) TEST DEVICE

(71) Applicant: NIPPON TELEGRAPH AND TELEPHONE CORPORATION, Tokyo (JP)

(72) Inventor: Hiroshi Kurakami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 408 days.

(21) Appl. No.: 17/428,618

(22) PCT Filed: Jan. 22, 2020

(86) PCT No.: PCT/JP2020/002141
§ 371 (c)(1),
(2) Date: Aug. 4, 2021

(87) PCT Pub. No.: WO2020/162181
PCT Pub. Date: Aug. 13, 2020

(65) Prior Publication Data
US 2022/0116413 A1 Apr. 14, 2022

(30) Foreign Application Priority Data
Feb. 7, 2019 (JP) ................................. 2019-021081

(51) Int. Cl.
*H04L 9/40* (2022.01)
(52) U.S. Cl.
CPC ...... *H04L 63/1433* (2013.01); *H04L 63/0236* (2013.01); *H04L 63/0884* (2013.01)
(58) Field of Classification Search
CPC ..... G06F 21/44; H04L 12/66; H04L 63/0236; H04L 63/08; H04L 63/0884; H04L 63/1433
See application file for complete search history.

(56) References Cited

U.S. PATENT DOCUMENTS 8,149,730 B1 * 4/2012 Aybay ..................... H04L 43/10
370/389
9,001,687 B2 * 4/2015 Somoskoi ........... H04L 43/0852
370/252

(Continued)

FOREIGN PATENT DOCUMENTS

JP 201441463 A 3/2014
JP 2017195432 A 10/2017

OTHER PUBLICATIONS

IXIA (2005) "Denial of Service (DOS) Testing IxChariot" literature, 9 pages.

*Primary Examiner* — Gary S Gracia (57) ABSTRACT

A testing device (10) transmits a test packet that increases processing load to a device protected by a security system, the security system performing authentication of a packet transmitted to a to-be-protected device and a packet limit per source IP address. In addition, the testing device (10) generates a test session according to a scenario when transmitting the test packet and configures a packet so that the test packet uses a plurality of source IP addresses. In addition, the testing device (10) responds to a response request up to a predetermined stage of authentication among a plurality of stages of authentication performed by the security system so that the security system authenticates the test packet to be valid. In addition, the testing device (10) monitors, at a predetermined stage, packet filtering situation and processing load of the security system to which the test packet is transmitted.

20 Claims, 5 Drawing Sheets

(56) References Cited

U.S. PATENT DOCUMENTS

| | | | | |
|---|---|---|---|---|
| 9,413,783 B1* | 8/2016 | Keogh | ............... | H04L 63/1458 |
| 10,212,195 B2* | 2/2019 | Maskalik | ............ | H04L 43/0852 |
| 10,728,281 B2* | 7/2020 | Kurakami | ........... | H04L 63/1425 |
| 2007/0166051 A1* | 7/2007 | Sebayashi | ........... | H04L 63/1441 |
| | | | | 398/177 |
| 2014/0258524 A1* | 9/2014 | Thyni | ................ | H04L 43/0852 |
| | | | | 709/224 |
| 2018/0041471 A1* | 2/2018 | Sudo | .................. | H04L 63/1416 |
| 2018/0337888 A1* | 11/2018 | Yu | .......................... | H04L 63/20 |
| 2020/0137084 A1* | 4/2020 | Roy | ................. | H04L 63/0236 |
| 2020/0351304 A1* | 11/2020 | Kurakami | ........... | H04L 63/1425 |
| 2021/0044518 A1* | 2/2021 | Oi | ........................ | H04L 45/306 |
| 2021/0289060 A1* | 9/2021 | Huang | ............ | H04L 61/4511 |
| 2022/0116413 A1* | 4/2022 | Kurakami | ........... | H04L 63/0884 |
| 2022/0417127 A1* | 12/2022 | Nakata | ............... | H04L 43/0876 |

\* cited by examiner

TEST DEVICE

CROSS-REFERENCE TO RELATED APPLICATIONS

This application is a U.S. 371 Application of International Patent Application No. PCT/JP2020/002141, filed on 22 Jan. 2020, which application claims priority to and the benefit of JP Application No. 2019-021081, filed on 7 Feb. 2019, the disclosures of which are hereby incorporated herein by reference in their entireties.

TECHNICAL FIELD

The present invention relates to a testing device.

BACKGROUND ART

Schemes have conventionally been proposed that transmit a packet for applying load to an instrument to perform packet load test (for example, see NPL 1). Schemes have also been proposed that perform packet load test on a subject device protected by a security system (for example, see PTL 1).

CITATION LIST

Patent Literature

[PTL 1] Japanese Patent Application Publication No. 2017-195432

Non Patent Literature

[NPL 1] IXIA, "Denial of Service (DOS) Testing"

SUMMARY OF THE INVENTION

Technical Problem

Unfortunately, the conventional schemes have a problem that although they can pass an instrument that makes a response request for authentication, they have a limited source IP address that establishes a session of HTTP, etc., so that they are discarded by the number of packets filter per unit of time per source IP address by a security instrument, such as Web Application Firewall (WAF), and they cannot perform the packet load test. There is also a problem that a plurality of testing devices are necessary not to correspond to the number of packets filter per unit of time per source IP address, thus incurring high cost. There is another problem that the test scenario is limited to an authentication response and simple transmission such as HTTP GET Flood, so that the to items for the to-be-tested device are limited although the security system can be passed.

Means for Solving the Problem

In order to solve the above problems and achieve the purpose, a testing device according to the present invention includes a transmission unit for transmitting a test packet that increases processing load to a device protected by a security system, the security system performing authentication of a packet transmitted to a to-be-protected device and a packet limit per source IP address; a test scenario unit for generating a test session according to a scenario when transmitting the test packet; an address distribution unit for configuring a packet so that she test packet uses a plurality of source IP addresses; a response unit for responding to response requests up to a predetermined stage of authentication among a plurality of stages of authentication performed by the security system so that the security system authenticates the test packet to be valid; and a surveillance unit for monitoring, at the pr determined stage, packet filtering situation and processing load of the security system to which the test packet is transmitted.

Effects of the Invention

The present invention may perform packet load test such as log in and search on a device protected by a security system, the security system performing authentication of a packet transmitted to a to-be-protected device and packet limitation per source IP address.

DESCRIPTION OF EMBODIMENTS

An embodiment of a testing device according to this application will be described in more detail below in conjunction with drawings. Note that this embodiment is not intended to limit the present invention.

[Configuration of First Embodiment]

Figure 1:
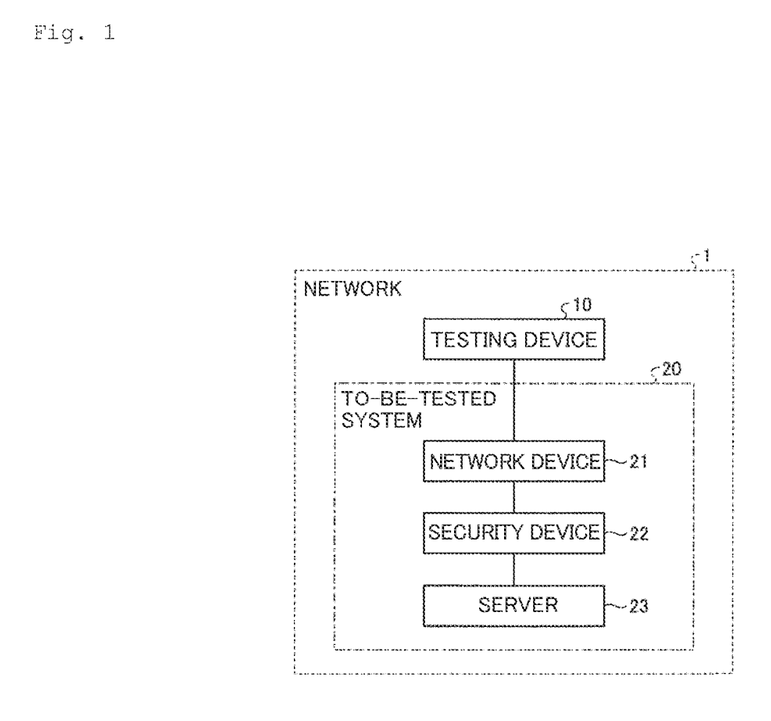
FIG. 1 illustrates an example configuration of a network having a testing device according to a first embodiment.

First, a configuration of a network having a testing device according to a first embodiment will be described with reference to FIG. 1. FIG. 1 illustrates an example configuration of a network having a testing device according to the first embodiment.

As shown in FIG. 1, a network 1 includes a testing device 10 and a to-be-tested system 20. In addition, the to-be-tested system 20 includes a network device 21, a security device 22, and a server 23. The systems and devices in the network 1 are connected by, for example, any type of communication network including wired or wireless local area network (LAN) and virtual private network (VPN).

The testing device 10 includes a test packet transmitting/receiving unit 121, a monitoring unit 122, a management unit 123, and a storage unit 13. The test packet transmitting/receiving unit 121 transmits a test packet for security resistance test to the devices included in the to-be-tested system 20. The test packet transmitting/receiving unit 121 also receives a packet transmitted from the to-be-tested system 20 in response to the test packet. The monitoring unit 122 monitors the load situation of the devices in the to-be-tested system 20. In addition, the management unit 123 performs setting and acquires and analyzes information related to the test packet transmitting/receiving unit 121 and the monitoring unit 122.

For example, in the example in FIG. 1, the testing device 10 performs the test packet transmitting/receiving unit 121 and monitoring unit 122 according to the setting by the management unit 123. Note that for example, a plurality of testing devices 10 may be distributed so that the test packet transmitting/receiving unit 121, the monitoring unit 122, and the management unit 123 are performed distributedly by the testing devices.

Figure 2:
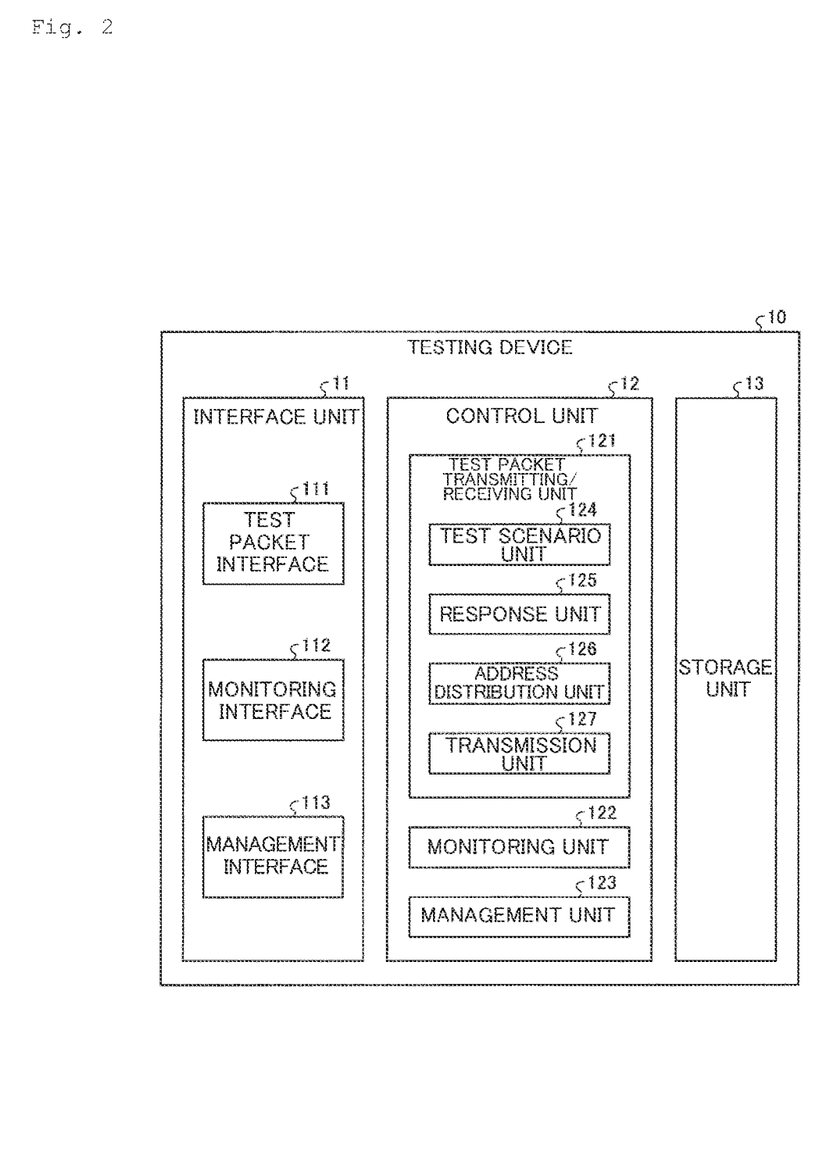
FIG. 2 illustrates an example configuration of the testing device according to the first embodiment.

Here, with FIG. 2, the testing device 10 will be described. FIG. 2 illustrates an example configuration of the testing device according to the first embodiment. As shown in FIG. 2, the testing device 10 includes an interface unit 11, a control unit 12, and a storage unit 13.

The interface unit 11 is an interface for communication control with other devices. For example, the interface unit 11 transmits and receives a packet to/from other devices through a network. In addition, the interface unit 11 is, for example, a network interface card such as a LAN card.

The interface unit 11 includes a test packet interface 111, a monitoring interface 112, and a management interface 113. The test packet interface 111 transmits and receives a packet when performing the test packet transmitting/receiving function. In addition, the monitoring interface 112 transmits and receives a packet when performing the monitoring unit 122 in the testing device 10. In addition, the management interface 113 transmits and receives a packet when performing the management unit 123 in the testing device 10.

The control unit 12 controls the entire testing device 10. For example, the control unit 12 is an electronic circuit such as the central processing unit (CPU), micro processing unit (MPU), and graphical processing unit (GPU) or an integrated circuit such as the application specific integrated circuit (ASIC) and field programmable gate array (FPGA). The control unit 12 includes a test packet transmitting/receiving unit 121, a monitoring unit 122, and a management unit 123. Note that the monitoring unit 122 is an example of a surveillance unit.

A test scenario unit 124 establishes HTTP and HTTPS sessions with the to-be-tested system 20 such as a Web server according to a scenario written in script, etc. and then generates a test packet for the to-be-tested system 20. The test scenario unit 124 also generates a test packet based on the cookie received from the server 23 to transmit a test packet carrying session information such as log-in information. The test scenario unit 124 performs test packets other than GET and POST Flood, including attack tests of creating and deleting a plurality of accounts for the server 23, frequent log in and out from the accounts, and frequent searches, and also an attack test, such as Slow READ, of changing the TCP header on the carried session.

A response unit 125 receives a response request corresponding to TCP authentication, HTTP authentication, and challenge response authentication performed by the security device 22, identifies the received response request, and makes a response that adapts to the identified response request, in other words, a response by which the security device 22 authenticates the attack packet to be valid.

An address distribution unit 126 distributes source IP addresses of the test packets to be transmitted according to a preset IP address list. By way of example, the address distribution unit 126 allocates, to the TCP SYN packet transmitted as the test packet, different source IP addresses according to the IP address list, and in the subsequent same TCP connection, uses the same source IP address, thus communicating using different source IP addresses in a plurality of TCP connections. In addition, if the address distribution unit 126 is notified of a packet filtering threshold of the to-be-tested system from the monitoring unit 122, the address distribution unit 126 controls the number of source IP addresses and adjusts the test packet transmission per source IP address not to correspond to the packet filtering threshold of the to-be-tested system.

A transmission unit 127 transmits a test packet for increasing processing load to the server 23 protected by the security device 22, the security device 22 performing authentication of a packet transmitted to the to-be-protected device. When the transmission unit 127 transmits a test packet, if the security device 22 has a packet discard function with a packet signature, the transmission unit 127 sets packet information such as a user agent to be the same as that of a general browser in order to prevent the test packet from being determined as not the general browser and discarded according to the packet information such as the user agent. By way of example, a packet transmitting function of the general browser may be used.

The monitoring unit 122 monitors situations of packet filtering and processing load of the security device 22 or server 23 to which an attack packet authenticated valid by the security device 22 is transmitted. As monitoring of the packet filtering situation, the monitoring unit 122 monitors the number of test packets, the byte amount, and the number of sessions per unit of time per source IP address, and the response packet from the to-be-tested system. Then the monitoring unit 122 knows the source IP address that comes to receive no response packet even if it is transmitting a test packet, although other source IP address test packets receive a response packet. As the packet filtering threshold of the to-be-tested system, the monitoring unit 122 records the number of test packets, the byte amount, the number of sessions, and the time stamp that are transmitted at the time immediately before the relevant source IP address comes to receive no response packet. The monitoring unit 122 then notifies the control unit 12 of those values.

The storage unit 13 stores various types of information used in performing the control unit. For example, the storage unit 13 is a semiconductor memory device such as random access memory (RAM) and flash memory or a storage device such as a hard disk and an optical disk, etc.

The testing device 10 may perform a packet load test on the devices included in the to-be-tested system 20. Here, the packet load test by the testing device 10 will be described with reference to the packet load test on the security device 22 and server 23 by way of example.

In transmitting the packet to the server 23, the to-be-tested system 20 allows the security device 22 to pass the normal browser communication and block out an attack packet by a bot or an attack tool. For example, if the security device 22 senses transmission of a packet to the server 23, the device 22 makes an authentication request for the relevant packet. For example, the TCP authentication, HTTP authentication, and challenge response authentication are requested. The security device 22 also monitors the number of packets, the byte amount, the number of sessions per unit of time per source IP address, etc. If they exceed a predetermined threshold, the security device 22 registers the relevant source IP address in a blacklist. This is based on that the source of the packet is a general browser operated by a person, the operator makes a response that adapts to the response request, and the number of packets and byte amount per unit of time transmitted by a general browser operated by a person does not correspond to a predetermined threshold.

In addition, simple packet transmission such as SYN Flood and GET Flood for testing the processing load on the server 23 may only measure the processing load of a part of the server processing that addresses the denial-of-service attack.

Thus, with the conventional attack tool that is intended for the packet load test, it has been difficult to perform the packet load test that measures the processing load at each stage of the server 23 and security device 22.

Figure 3:
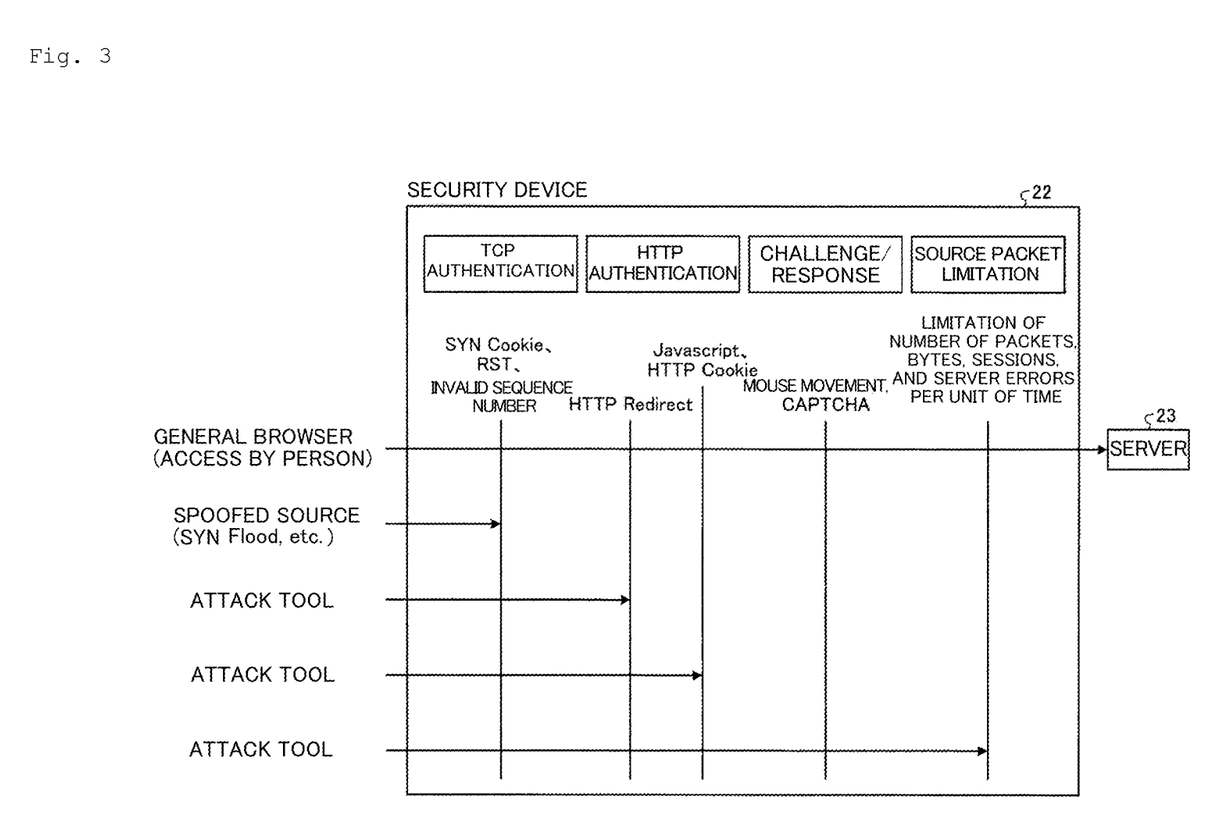
FIG. 3 illustrates a multi-stage protect function.

First, with reference to FIG. 3, a multi-stage protect function will be described. FIG. 3 illustrates the multi-stage protect function. As shown in FIG. 3, in transmitting the packet to the server 23, the security device 22 needs to perform limitation of the number of source packets and authentication at a plurality of stages. The security device 22 performs, for example, the TCP authentication, HTTP authentication, challenge response authentication, limitation of the number of source packets per unit of time, limitation of the number of source bytes per unit of time, and limitation of the number of sessions per unit of time.

For example, if the security device 22 senses the transmission of the packet to the server 23, the device 22 monitors, for the relevant packet, the number of packets and the number of sessions, etc. per source IP address. If the source of the packet clears the threshold based on the number of packets and the number of sessions, etc. transmitted by the general browser operated by a person, then the security device 22 may allow the packet to pass the function of limiting the number of source packets. For example, if the threshold to be passed is set as 6 packets/sec or below and 6 sessions/sec or below, the security device 22 determines that the source IP address meeting the threshold to be passed is communication from the general browser and passes it.

Meanwhile, if the transmitted packet is intended for an SYN Flood attack by a spoofed source, the security device 22 discards the relevant packet at the stage of TCP authentication. Therefore, even if the packet is transmitted by the attack tool intended for the packet load test on the server 23, the security device 22 senses, at a predetermined stage, that the transmission of the relevant packet is the attack and discards the relevant packet. Additionally, even if there is an attack tool that may respond to the TCP authentication, HTTP authentication, and challenge/response, the attack tool may be determined to be the attack according to the limitation of the number of packets, the limitation of the number of bytes, and the limitation of the number of sessions per unit of time by the source packet limitation. Thus, the relevant source IP address may be registered in a blacklist and the packet may be discarded. Thus, with the conventional attack tool that is intended for the packet load test, it has been difficult to perform the packet load test on the server 23 and security device 22.

In contrast, the testing device according to the first embodiment may allow for the packet load test on the server 23 and security device 22. Here, with reference to FIG. 4, a description is given of operations when the testing device 10 performs the packet load test on the server 23 or security device 22.

Figure 4:
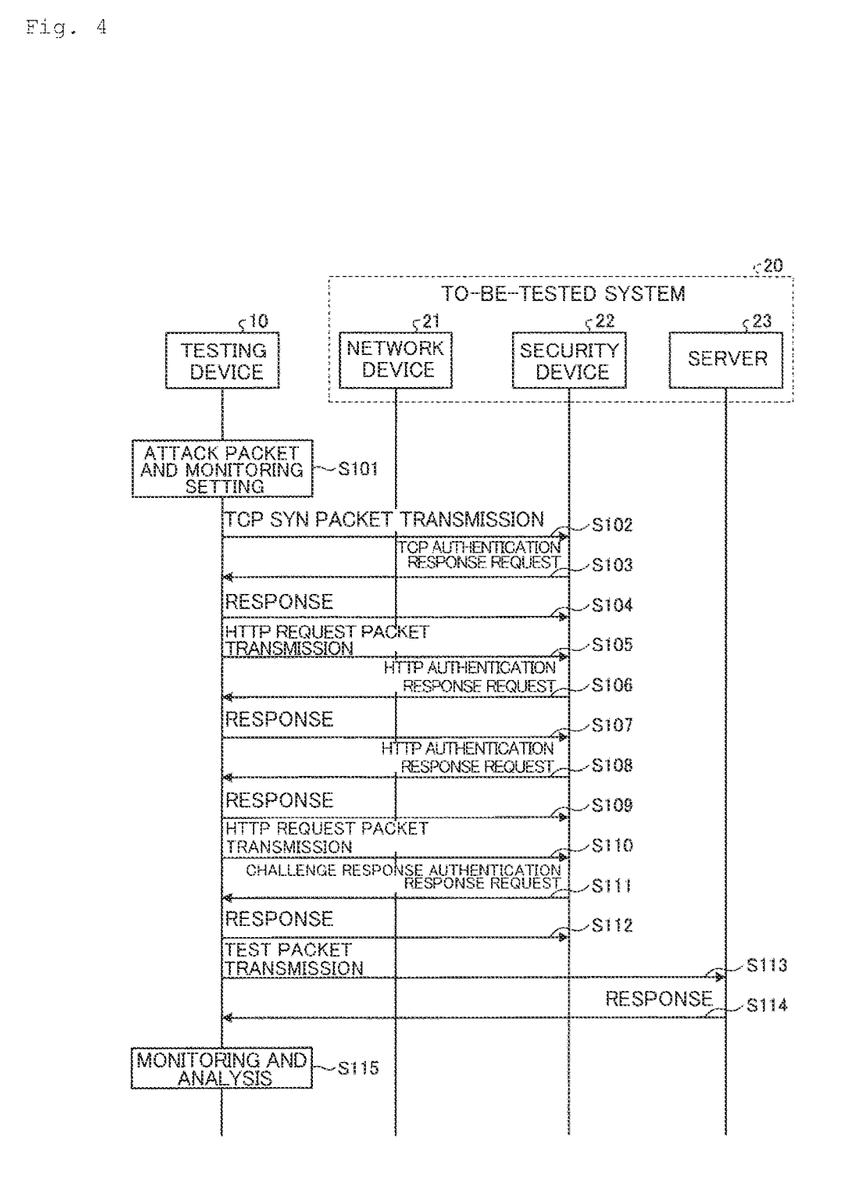
FIG. 4 is a sequence diagram for illustrating a packet load test by the testing device according to the first embodiment.

FIG. 4 is a sequence diagram for illustrating the packet load test by the testing device according to the first embodiment. First, the testing device 10 sets the attack packet and monitoring (step S101). In so doing, the testing device 10 sets to transmit test packets in which, for example, a large amount of test packets log into the server after the HTTP connection and a large amount of searches are performed. In addition, the testing device 10 sets monitoring that performs, for example, response confirmation to ping and traceback of the example server 23 or HTTP response confirmation. In addition, as monitoring of the packet filtering situation, the testing device 10 monitors the number of test packets, the byte amount, and the number of sessions per unit of time per source IP address, and the response packet from the to-be-tested system. The testing device 10 then knows the source IP address that comes to receive no response packet even if it is transmitting a test packet, although other source IP address test packets receive a response packet. The testing device 10 sets to record, as the packet filtering threshold of the to-be-tested system, the source IP address that comes to receive no response packet, the number of test packets, the byte amount, the number of sessions, and the time stamp that are transmitted at the time immediately before the relevant source IP address comes to receive no response packet, then notify the control unit 12 of those values.

Then, the transmission unit 127 in the testing device 10 transmits the test packet from the test packet interface 111. In so doing, first, the transmission unit 127 transmits a TCP SYN packet to the IP address 10.0.0.1 of the server 23 to establish TCP connection with the server 23 (step S102).

In response, the security device 22 makes a TCP authentication response request to determine whether the SYN packet transmitted to the server 23 is the attack packet (step S103). Note that if the TCP connection is established, an SYN/ACK packet is transmitted to the source of the SYN packet.

Here, it is known that even if an invalid packet is transmitted to the SYN packet, for example, the attack tool does not make a response that adapts to the invalid packet and transmits the SYN packet again. Thus, for the TCP authentication, the security device 22 transmits to the testing device 10, invalid packets such as, for example, an SYN/ACK packet with a cookie, an SYN/ACK packet including invalid ACK sequence number, an ACK packet, and an RST packet. Then, if a response is returned that adapts to the transmitted invalid packet, the security device 22 allows the SYN packet to pass the TCP authentication.

Here, the response unit 125 in the testing device 10 makes a response to the security device 22 that adapts to the TCP authentication response request (step S104). For example, if an SYN/ACK packet including an SYN packet with a cookies is transmitted, the response unit 125 identifies that the relevant packet is an SYN/ACK packet with a cookie. Then, the response unit 125 transmits to the security device 22 an ACK packet with a sequence number that is set based on the contents of the relevant cookie. Note that it is considered that an attack tool intended for the SYN Flood attack makes no response even if the security device 22 transmits an SYN/ACK packet with a cookie.

The testing device 10 may thus establish the TCP connection. with the server 23 and prevent the test packet transmitted by the transmission unit 127 from being discarded at the stage of TCP authentication. Then, the testing device 10 may perform the packet load test on the security device 22 and server 23 in the authentication at the stage before the TCP authentication.

If the TCP connection is established, the transmission unit 127 transmits an HTTP request packet to the server 23 (step S105). The security device 22 makes an HTTP authentication response request to determine whether the HTTP request packet transmitted to the server 23 is the test packet (step S106).

Here, the response unit 125 makes a response to the security device 22 that adapts to the HTTPS authentication (step S107). For example, the response unit 125 identifies that the response from the security device 22 is a redirect response. Then, the response unit 125 transmits an HTTP request packet to a redirect destination that is specified to a value such as a uniform resource identifier (URI) indicated by a Location header in the redirect response. Note that it is considered. that an attack tool that does not make a response adapting to the redirect response does not refer to the Location header or transmit the HTTP request packet to the redirect destination.

Additionally, in order to determine whether the HTTP request packet transmitted to the transmission server 23 is the attack packet, the security device 22 makes an HTTP authentication response request using an HTTP cookie or JavaScript (registered trademark) (step S108).

In the HTTP authentication using the HTTP cookie or JavaScript, the security device 22 requests, for example, the testing device 10 to perform processing of reading the contents in the cookie and returning the read result using the program written in JavaScript. Then, if the performed result of the relevant program is returned in a predetermined time, the security device 22 allows the HTTP request packet to pass the HTTP authentication.

Here, the response unit 125 makes a response to the security device 22 that adapts to the HTTP authentication using an HTTP cookie or JavaScript (step S109). For example, the response unit 125 identifies that data transmitted from the security device 22 is a run command in JavaScript. Then, the response unit 125 notifies the security device 22 of the contents in the cookie obtained as a result of performing the program written in JavaScript. Note that it is considered that an attack tool that does not make a response adapting to the HTTP authentication using the JavaScript and cookie makes no response to the HTTP authentication using the HTTP cookie or JavaScript.

The testing device 10 may thus pass the HTTP authentication, thus preventing the attack packet transmitted by the transmission unit 127 from being discarded at the stage of HTTP authentication. Then, the testing device 10 may perform the packet load test on the security device 22 and server 23 in the authentication at a stage before the HTTP authentication.

Additionally, if the HTTP authentication is performed, the transmission unit 127 transmits a HTTP request packet to the server 23 (step S110). In order to determine whether the HTTP request packet transmitted to the server 23 is the attack packet, the security device 22 makes a challenge response authentication response request (step S111).

When performing the challenge response authentication, the security device 22 requests, for example, the testing device 10*b* to perform a mouse movement on a predetermined path or the Completely Automated Public Turing test to tell Computers and Humans Apart (CAPTCHA). When a response is returned that adapts to the mouse movement or the CAPTCHA, the security device 22 allows the HTTP request packet to pass the authentication by the challenge response authentication.

Here, the response unit 125 makes a response to the security device 22 that adapts to the challenge response authentication (step S112). For example, the response unit 125 identifies that the security device 22 indicates a mouse movement path. Then, the response unit 125 reads the path indicated as the mouse movement path and transmits to the security device 22 the same signal as that generated when a mouse is moved along the read path.

The response unit 125 also identifies that the security device 22 indicates the CAPTCHA. Then, the response unit 125 transmits to the security device 22 text data converted from the CAPTCHA by an image-to-text service or OCR, etc. Note that it is considered that an attack tool that does not make a response adapting to the challenge response authentication makes no response to the challenge response authentication by the mouse movement or CAPTCHA.

The testing device 10 may thus pass the challenge response authentication, thus preventing the test packet transmitted by the transmission unit 127 from being discarded at the stage of challenge response authentication. The testing device 10 transmits the test packet to the server 23 in the to-be-tested system 20 (step S113). The testing device 10 also receives the response packet from the to-be-tested system 20 (step S114). The testing device 10 may thus perform the packet load test on the server 23.

Increase of the source IP addresses of the test packets that may be transmitted from the single testing device 10 may allow for simulating the denial-of-service attack from a plurality of attackers and transmitting the test packets from a plurality of IP addresses without preparing multiple control unit. In the testing device, thus reducing the test resources. If, for example, the test packet to be transmitted is the TCP SYN packet, the address distribution unit 126 allocates source IP addresses different from those of the previous TCP SYN packets sequentially according to the IP address list set by the management unit 123 and allocates the same source IP addresses to the relevant TCP connections. This may thus allow for transmitting the test packets from a plurality of source IP addresses while maintaining the IP address consistency of the TCP connection.

Then, on the test packet transmitted from the testing device 10 and the response packet from the to-be-tested system 20 to the test packet, the monitoring unit 122 monitors and analyzes the situation of the packet filtering of the to-be-tested system 20 for the test packet (step S115). As monitoring of the packet filtering situation, the monitoring unit 122 monitors the number of test packets, the byte amount, and the number of sessions per unit of time per source IP address, and the response packet from the to-be-tested system. The monitoring unit 122 then knows the source IP address that comes to receive no response packet even if it is transmitting a test packet, although other source IP address test packets receive a response packet. The monitoring unit 122 sets to record, as the packet filtering threshold of the to-be-tested system 20, the source IP address that comes to receive no response packet, the number of test packets, the byte amount, the number of sessions, and the time stamp that are transmitted at the time immediately before the relevant source IP address comes to receive no response packet, then notify the control unit 12 of those values.

If the address distribution unit 126 in the control unit 12 is notified of the packet filtering threshold of the to-be-tested system 20 from the monitoring unit 122, the address distribution unit 126 controls the number of source IP addresses and adjusts the test packet transmission per source IP address not to correspond to the packet filtering threshold of the to-be-tested system. For example, the address distribution unit 126 stops, for a certain amount of time, transmission from the source IP address that comes to receive no response packet and is determined. to be packet filtered. The address distribution unit 126 then transmits a test packet from a new source IP address that has not been packet filtered yet. The address distribution unit 126 also performs packet transmission per source IP address in a limited range that does not correspond to the packet filtering.

The testing device 10 may thus pass the source packet limitation as shown in FIG. 3, thus preventing the test racket transmitted by the transmission unit 127 from being discarded at the stage of source packet limitation. The testing device 10 may thus perform the packet load test on the subject server 23.

Simple packet transmission such as SYN Flood and GET Flood as the packet load test on the server 23 may only measure the processing load of a part of the server processing that addresses the denial-of-service attack. Then, the test scenario unit 124 establishes the HTTP and HTTPS sessions with the to-be-tested system 20 such as a Web server according to a scenario written in script, etc. The test scenario unit 124 then generates a test packet based on the cookie received from the server 23 to transmit the test packet carrying session information such as log-in information to the server 23. The test scenario unit 124 performs test packets other than GET and POST Flood, including attack tests of creating and deleting a plurality of accounts for the server 23, frequent log in and out from the accounts, and frequent searches, and also an attack test, such as Slow READ, of changing the TCP header on the carried session.

This may allow for measuring, on the server 23, simple server processing load such as HTTP GET packet processing load and HTTP POST packet processing load as well as performing load test for processing load such as server 23 log-in information encryption and decryption processing load, search processing load, and database processing load.

Meanwhile, the monitoring unit 122 makes a monitoring response request to the server 23. For example, the monitoring unit 122 makes response confirmation to ping or traceback of the server 23 or HTTP response confirmation according to the setting by the testing device 10.

Then, the server 23 responds to the monitoring response request while processing the attack packet. Then, the monitoring unit 122 outputs the monitoring results from the monitoring interface 112.

Additionally, the testing device 10 analyzes the monitoring results and instructs the testing device 10 to change the scenario as necessary. Specifically, the testing device 10 analyzes the response time and response contents of the server 23 while taking correlation between the received monitoring results and test traffic, which is a type or amount of the attack packet. The testing device 10 records and analyzes, in a time series, the response time change and response message of the server 23, the test traffic contents when no response is received, and the test traffic contents when the response is restored, etc. and understands the function of high processing load.

As the scenario change, for example, the management unit 123 changes the amount of test packets transmitted by the transmission unit 127 depending on the situation of the processing load of the security device 22 or server 23. Specifically, if the processing load of the security device 22 or server 23 is at a predetermined level or more, the management unit 123 increases the amount of test packets transmitted to the security device 22 or server 23 by the transmission unit 127.

Then, the management unit 123 understands the function of high processing load and changes the scenario of the test traffic. The management unit 123 then extracts the test traffic condition at which the function of high processing load has the maximum load, according to the response time change and response message of the server 23 when the scenario is changed, the test traffic contents when no response is received, and the test traffic contents when the response is restored.

Note that the testing device 10 may test and analyse a plurality of to-be-tested instruments including other than the server 23 and understand the instrument of high processing load among the to-be-tested instruments.

For example, as the testing device 10 increases the amount of log-in attack packets, the processing load of the server 23 increases and the HTTP response time increases. Then, the testing device 10 records the amount of attack packets when the server 23 makes the HTTP 404 error response in which the server is connected but cannot display the web page and the amount of attack packets when the server 23 cannot respond. The testing device 10 may thus understand the resistance of the server 23 against the log-in attack.

In addition, as the test packet increases in its amount, the security device 22 may detect the attack and discard the relevant attack packet, thus stopping the increase of the processing load of the server 23. In so doing, the testing device 10 understands, from the monitoring results, that increasing the attack packets to the server 23 does not increase the processing load of the server 23. In this case, the testing device 10 may test if the processing load increases by transmitting, by processing of the address distribution unit 126, the test packets from different source IP addresses in a range that does not correspond to the packet filtering threshold.

Additionally, the denial-of-service attack packet, etc, may be transmitted to the server 23 from not only the single testing device 10 but a plurality of testing devices according to the scenario. Thus, a countermeasure for a large amount of attacks per source IP address and the countermeasure effectiveness of cache, etc. may be studied and further monitored to understand the denial-of-service limitation, bottleneck, and test traffic pattern at that time, etc.

This may determine whether the responses of the server 23 monitored by a plurality of testing devices are different due to the filter setting to the testing device 10 by the network device 21, security device 22, or server 23 itself, or the load of the server 23.

Note that the testing device 10 may quit the authentication on the way and perform the load test on the processing of the security device 22 at any authentication stage. For example, the testing device 10 may make a response that adapts to the TCP authentication response request by the security device 22, and then does not make a response that adapts to the HTTP authentication response request by the security device 22. The testing device 10 may thus perform the load test on the processing of the security device 22 at the HTTP authentication stage. Likewise, the testing device 10 may perform the load test on the security device 22 at each authentication stage to identify the authentication stage that is the bottleneck.

[Effects of First Embodiment]

The test scenario unit 124 in the testing device 10 establishes the HTTP and HTTPS sessions with the to-be-tested device such as a Web server and then generates a test packet for performing log in and search, etc. to the to-be-tested device according to the scenario. The address distribution unit 126 distributes source IP addresses of test packets to be transmitted according to a preset IP address list, uses the same source IP address in the same connection, and changes the packet amount per source IP address to avoid the packet filtering depending on the packet filtering situation of the security device 22 and server 23. According to the packet generated by the test scenario unit 124 and the source IP address setting by the address distribution unit 126, the transmission unit 127 transmits a test packet that increases processing load. In addition, the response unit 125 receives a response request corresponding to the authentication performed by the security device 22, identifies the received response request, and makes a response that adapts to the identified response request, in other words, a response by which the security device 22 authenticates the attack packet to be valid. In addition, the monitoring unit 122 monitors the situation of the processing load of the server or the authentication function of high processing load of the security device 22 to which the attack packet authenticated to be valid by the security device 22 is transmitted.

As described above, the testing device 10 according to the first embodiment may pass authentication by making a response that adapts to the response request corresponding to the authentication, avoid the packet filtering per source IP address, and then test the security resistance by applying load to decryption processing of the to-be-tested instrument and a plurality of points including database and the like. In addition, testing a plurality of stages of authentication and a plurality of instruments may identify the bottleneck.

In addition, every time the response unit 125 receives a response request corresponding to up to any stage of authentication among the stages of authentication performed stepwise by the security device 22, the response unit 125 identifies the received response request and makes a response that adapts to the identified response request, in other words, a response by which the security system authenticates the test packet to be valid. The security device 22 may thus be tested at its any stage.

The transmission unit 127 transmits to the server 23 such as a Web server, the test packet and a packet generated by operation of the Web browser. The test may thus be done in a situation close to the actual attack.

The management unit 123 changes the amount of attack packets transmitted by transmission unit 127 depending on the situation of the processing load of the security device 22 or server 23. This may allow for understanding of the operation of the to-be-tested instrument depending on the processing load.

If the processing load of the security device 22 or server 23 is at a predetermined level or more, the management unit 123 changes the contents of the test packets transmitted to the security device 22 or server 23 by the transmission unit 127. This may allow for understanding of the limitation of the processing load of the to-be-tested instrument.

[Other Embodiments]

If the server 23 is a server other than the Web server, such as a DNS server, or if the network device 21 or security device 22 is studied, the testing device 10 transmits the normal packet and a denial-of-service attack packet according to the protocol and application being served by the to-be-tested instrument. In so doing, the security device 22 may transmit a request of DNS authentication, etc. such as a TCP retransmission request, but the testing device 10a transmits a packet according to the request. Thus, even if additional authentication is performed, the security resistance and bottleneck may be studied on the to-be-tested instrument.

[System Configuration, etc.]

In addition, the elements of the devices shown are ideational functions and may not be necessarily configured as physically shown. In other words, specific aspects of the distribution and integration of the devices are not limited to those as shown, and all or some of the devices may be configured by functionally or physically distributing or integrating them in any unit depending on various loads and utilization or the like. Additionally, for the processing functions performed by the devices, all or any part of the functions may be achieved by a CPU and a program analyzed and performed by the CPU or achieved as hardware with a wired logic.

In addition, among the processing described in this embodiment, all or part of the processing described as being done automatically may be done manually or all or part of the processing described as being done manually may be done automatically in a well-known manner. In addition, information including the processing procedure, control procedure, specific names, and various types of data and parameters described in the above description and drawings may be arbitrarily changed unless otherwise described.

[Program]

In addition, a program written in a language executable by a computer may be created for processing performed by the testing device described in the above embodiment. For example, a program written in a language executable by a computer may be created for processing performed by the testing device according to the embodiment. In this case, the same effects as in the above embodiment may be provided by a computer executing the program. An example computer that performs a program will be described below.

Figure 5:
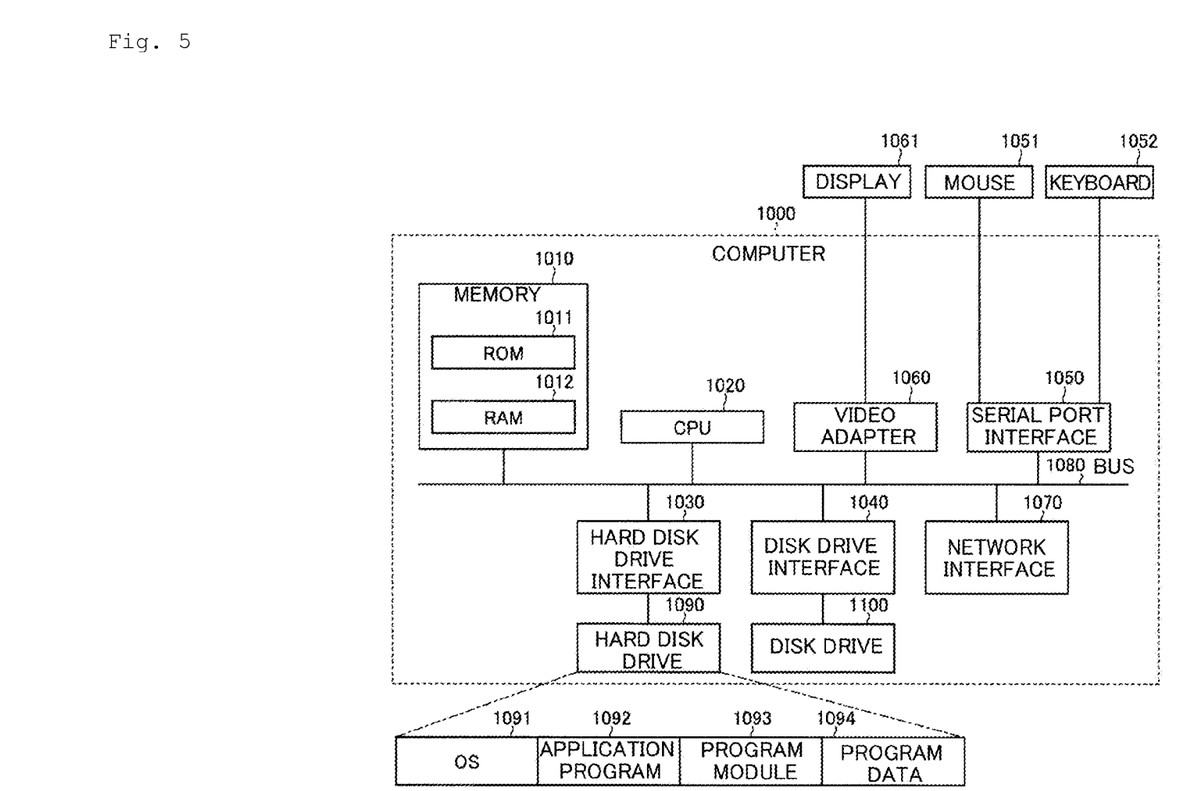
FIG. 5 illustrates a computer that performs a program.

FIG. 5 illustrates a computer that performs a program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected via a bus 1080.

The memory 1010 includes a read only memory (ROM) 1011 and a RAM 1012. The ROM 1011 stores, for example, a boot program such as basic input output system (BIOS). The hard disk drive interface 1030 is connected to a hard disk drive 1090. The disk drive interface 1040 is connected to a disk drive 1100. For example, a removable storage medium such as a magnetic disk and an optical disk is inserted in the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. In other words, a program defining the processing of the devices is implemented as the program module 1093 in which a computer executable code is described. The program module 1093 is stored in, for example, the hard disk drive 1090. For example, the program module 1093 for performing the same processing as in the function configuration in the devices is stored in the hard disk drive 1090. Note that the hard disk drive 1090 may be replaced with a solid state drive (SSD).

In addition, data used in the processing of the above embodiment is stored as the program data 1094 in, for example, the memory 1010 and hard disk drive 1090. Then, the CPU 1020 reads out the program module 1093 and program data 1094 stored in the memory 1010 and hard disk drive 1090 to the RAM 1012 as necessary and performs them.

Note that the program module 1093 and program data 1094 are not limited to being stored in the hard disk drive 1090, and may also be stored in, for example, a removable storage medium and read out by the CPU 1020 via the disk drive 1100, etc. Alternatively, the program module 1093 and program data 1094 may be stored is other computers connected via a network and WAN. Then, the program module 1093 and program data 1094 may be read out by the CPU 1020 from other computers via the network interface 1070.

REFERENCE SIGNS LIST

1 Network
10 Testing device
11 Interface unit

12 Control unit
13 Storage unit
20 To-be-tested system
21 Network device
22 Security device
23 Server
111 Test packet interface
112 Monitoring interface
113 Management interface
121 Test packet transmitting/receiving unit.
122 Monitoring unit
123 Management unit
124 Test scenario unit
125 Response unit
126 Address distribution unit
127 Transmission unit

The invention claimed is:

1. A testing device comprising:
a transmitter configured to transmit a test packet that increases processing load to a device protected by a security system, the security system performing authentication of a packet transmitted to a to-be-protected device and a packet limit per source IP address;
a test scenario generator configured to generate a test session according to a scenario when transmitting the test packet;
an address distributor configured to configure a packet so that the test packet uses a plurality of source IP addresses;
a responder configured to respond to response requests up to a predetermined stage of authentication among a plurality of stages of authentication performed by the security system so that the security system authenticates the test packet to be valid;
a surveillance monitor configured to monitor, at the predetermined stage, packet filtering situation and processing load of the security system to which the test packet is transmitted;
wherein the surveillance monitor monitors the packet filtering situation based at least on the number of test packets, the byte amount, and the number of sessions per unit of time per source IP address, and whether there is a response packet from a to-be-test device; and
wherein the surveillance monitoring identifies a relevant source IP address that receives no response packet although other source IP address test packets receive a response packet and records the source IP address that receives no response packet, the number of test packets, the byte amount, the number of sessions, and a time stamp that are transmitted.

2. The testing device according to claim 1, wherein the test scenario generator:
configures HTTP and HTTPS sessions with the to-be-tested device such as a Web server,
generates a test packet that performs log in and search to the to-be-tested device according to the scenario, and
generates a test packet according to a cookie received from the to-be-tested device to transmit a test packet carrying session information such as log-in information.

3. The testing device according to claim 1, wherein, when the responder receives a response request corresponding to authentication up to the predetermined stage, the responder identifies the received response request and responds to the identified response request so that the security system authenticates the test packet to be valid.

4. The testing device according to claim 1, wherein the address distributor distributes source IP addresses of test packets to be transmitted according to a preset IP address list and uses a same source IP address in a same connection.

5. The testing device according to claim 4, wherein, when the responder receives a response request corresponding to TCP authentication, HTTP authentication, or challenge response authentication, the responder identifies whether the received response request corresponds to TCP authentication, HTTP authentication, or challenge response as the type of the received response request, and makes a response so that the response is authenticated to be valid authentication in the identified types of authentication.

6. The testing device according to claim 1, wherein the transmitter transmits to the device such as a Web server the test packet and a packet generated by operation of a Web browser.

7. The testing device according to claim 1, further comprising:
a manager configured to change an amount of the test packet transmitted by the transmitter according to the packet filtering situation and processing load situation of the security system and the to-be-protected device.

8. The testing device according to claim 7, wherein, when the processing load of the security system is equal to or more than a predetermined value, the manager increases an amount of the test packet transmitted to the security system by the transmitter.

9. A method for testing, the method comprising:
transmitting, by a transmitter, a test packet that increases processing load to a device protected by a security system, the security system performing authentication of a packet transmitted to a to-be-protected device and a packet limit per source IP address;
generating, by a test scenario generator a test session according to a scenario when transmitting the test packet;
configuring, by an address distributor a packet so that the test packet uses a plurality of source IP addresses;
responding, by a responder to response requests up to a predetermined stage of authentication among a plurality of stages of authentication performed by the security system so that the security system authenticates the test packet to be valid;
monitoring, by a surveillance monitor, at the predetermined stage, a packet filtering situation and processing load of the security system to which the test packet is transmitted;
wherein the surveillance monitor monitors the packet filtering situation based at least on the number of test packets, the byte amount, and the number of sessions per unit of time per source IP address, and whether there is a response packet from a to-be-tested device; and
wherein the surveillance monitoring identifies the source IP address that comes to receive no response packet although other source IP address test packets receive a response packet and sets to record the source IP address that comes to receive no response packet, the number of test packets, the byte amount, the number of sessions, and a time stamp that are transmitted.

10. The method according to claim 9, wherein the test scenario generator:
configures HTTP and HTTPS sessions with the to-be-tested device such as a Web server, generates a test packet that performs log in and search, etc. to the to-be-tested device according to the scenario, and generates a test packet according to a cookie received from the to-be-tested device to transmit a test packet carrying session information such as log-in information.

11. The method according to claim 9, wherein, when the responder receives a response request corresponding to authentication up to the predetermined stage, the responder identifies the received response request and responds to the identified response request so that the security system authenticates the test packet to be valid.

12. The method according to claim 9, wherein the address distributor distributes source IP addresses of test packets to be transmitted according to a preset IP address list and uses a same source IP address in a same connection.

13. The method according to claim 12, wherein, when the responder receives a response request corresponding to TCP authentication, HTTP authentication, or challenge response authentication, the responder identifies whether the received response request corresponds to TCP authentication, HTTP authentication, or challenge response as the type of the received response request, and makes a response so that the response is authenticated to be valid authentication in the identified types of authentication.

14. The method according to claim 9, wherein the transmitter transmits to the device such as a Web server the test packet and a packet generated by operation of a Web browser.

15. The method according to claim 9, the method further comprising:

changing, by a manager, an amount of the test packet transmitted by the transmitter according to the packet filtering situation and processing load situation of the security system and the to-be-protected device.

16. The method according to claim 15, wherein, when the processing load of the security system is equal to or more than a predetermined value, the manager increases an amount of the test packet transmitted to the security system by the transmitter.

17. A computer-readable non-transitory recording medium storing computer-executable instructions that when executed by a processor cause a computer system to:

transmit, by a transmitter, a test packet that increases processing load to a device protected by a security system, the security system performing authentication of a packet transmitted to a to-be-protected device and a packet limit per source IP address;

generate, by a test scenario generator, a test session according to a scenario when transmitting the test packet;

configure, by an address distributor, a packet so that the test packet uses a plurality of source IP addresses;

respond, by a responder to response requests up to a predetermined stage of authentication among a plurality of stages of authentication performed by the security system so that the security system authenticates the test packet to be valid;

monitor, by a surveillance monitor, at the predetermined stage, a packet filtering situation and processing load of the security system to which the test packet is transmitted;

wherein the surveillance monitor monitors the packet filtering situation based at least on the number of test packets, the byte amount, and the number of sessions per unit of time per source IP address, and whether there is a response packet from a to-be-tested device; and wherein the surveillance monitoring identifies a relevant source IP address that receives no response packet although other source IP address test packets receive a response packet and records the source IP address that receives no response packet, the number of test packets, the byte amount, the number of sessions, and a time stamp that are transmitted.

18. The computer-readable non-transitory recording medium of claim 17, wherein the test scenario generator:

configures HTTP and HTTPS sessions with a to-be-tested device such as a Web server, generates a test packet that performs log in and search, etc. to the to-be-tested device according to the scenario, and generates a test packet according to a cookie received from the to-be-tested device to transmit a test packet carrying session information such as log-in information.

19. The computer-readable non-transitory recording medium of claim 17, wherein, when the responder receives a response request corresponding to authentication up to the predetermined stage, the responder identifies the received response request and responses to the identified response request so that the security system authenticates the test packet to be valid.

20. The computer-readable non-transitory recording medium of claim 17, wherein the address distributor distributes source IP addresses of test packets to be transmitted according to a preset IP address list and uses a same source IP address in a same connection, and wherein, when the responder receives a response request corresponding to TCP authentication, HTTP authentication, or challenge response authentication, the responder identifies whether the received response request corresponds to TCP authentication, HTTP authentication, or challenge response as the type of the received response request, and makes a response so that the response is authenticated to be valid authentication in the identified types of authentication.

* * * * *